(No Model.)  2 Sheets—Sheet 1.

W. V. LONG.
SAWING MACHINE.

No. 548,073. Patented Oct. 15, 1895.

WITNESSES:
Chas. Nida
Rev. G. Hoster

INVENTOR
W. V. Long
BY
Munn & Co.
ATTORNEYS.

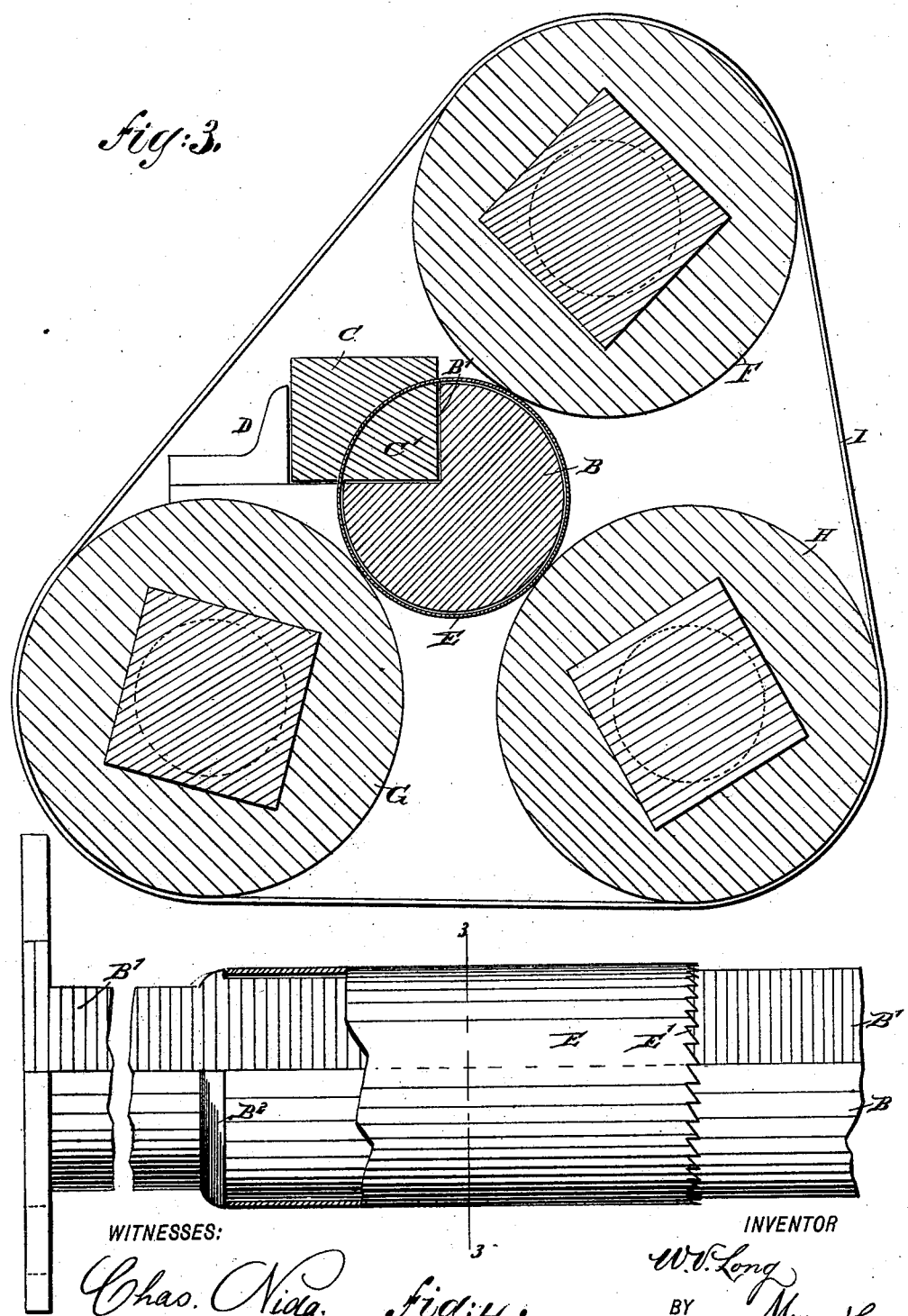

UNITED STATES PATENT OFFICE.

WILLIAM V. LONG, OF LEESVILLE, OHIO.

SAWING-MACHINE.

SPECIFICATION forming part of Letters Patent No. 548,073, dated October 15, 1895.

Application filed April 16, 1895. Serial No. 545,928. (No model.)

*To all whom it may concern:*

Be it known that I, WILLIAM V. LONG, of Leesville, in the county of Carroll and State of Ohio, have invented a new and Improved Sawing-Machine, of which the following is a full, clear, and exact description.

The invention relates to wood-working machinery, and its object is to provide a new and improved sawing-machine for producing moldings by cutting a bar of wood into two strips at one operation, preventing any waste of material.

The invention consists of certain parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1:
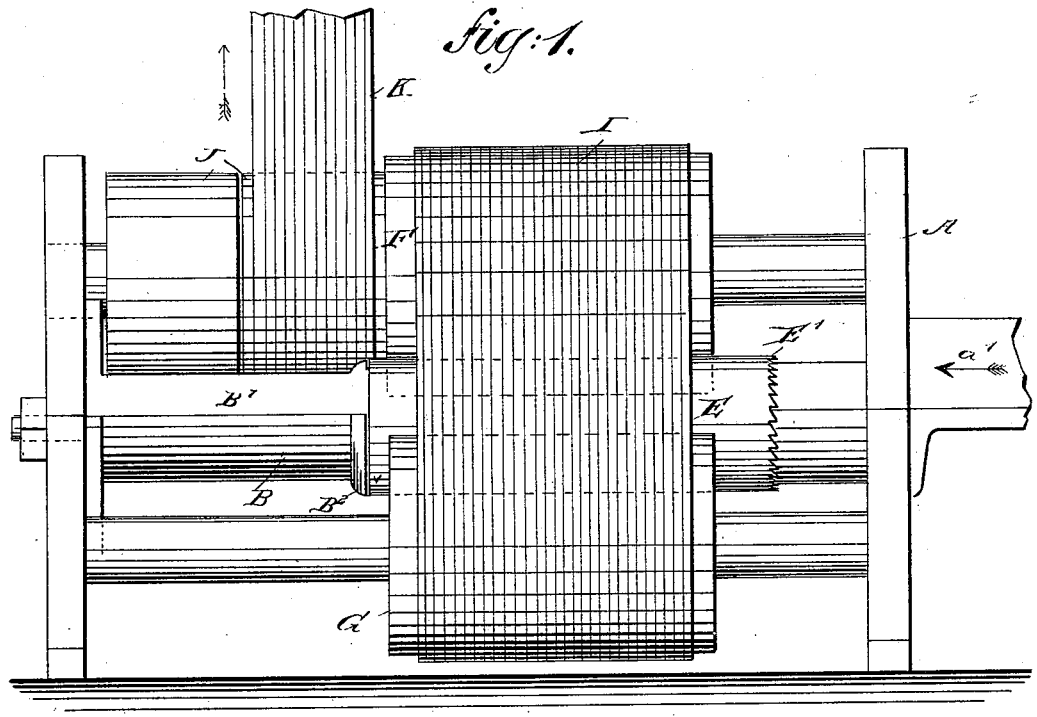
Figure 2:
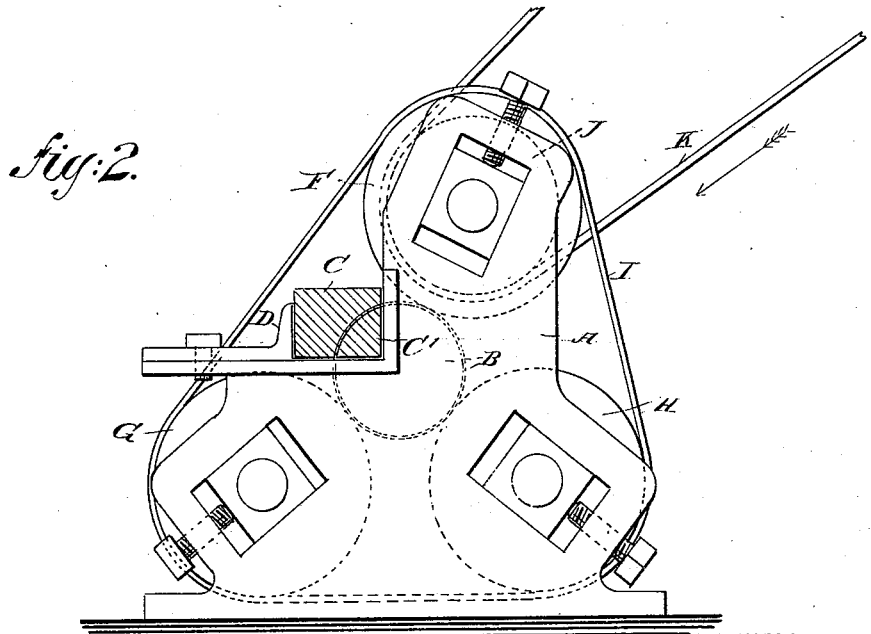

Figure 1 is a front elevation of the improvement. Fig. 2 is an end elevation of the same. Fig. 3 is an enlarged sectional side elevation of part of the improvement on the line 3 3 of Fig. 4; and Fig. 4 is a front elevation of the saw with parts broken out and parts in section.

The improved sawing-machine is provided with a suitably-constructed frame A, in the standards of which is secured a spindle B, formed with a longitudinally-extending recess B' for the passage of one of the strips C' cut from the bar of wood fitted to slide in suitable guideways D, arranged on the standards of the frame A. (See Fig. 4.) The strip C' is separated from the bar of wood to form a second strip C, and both these strips are themselves moldings which can be used for various purposes.

In order to cut the bar longitudinally to form the two strips C C', I provide a revoluble cylinder E, formed at its front edge with teeth E' and fitted to rotate loosely on the spindle B, with the rear end of the said cylinder abutting on a shoulder B², arranged on the spindle B. Now it will be seen that when the cylinder E is rotated and a bar of wood is pushed through the guideway D in the direction of the arrow a' it passes with one corner into the recess B' of the fixed spindle B, to be finally engaged by the edge teeth E' of the revolving cylinder E to cut the said bar of wood into the two strips C C', as is plainly shown in Figs. 2 and 3. The strip C forms a quarter-round, and the other strip is formed with a cove, and both strips can be used for decorating and other purposes.

In order to rotate the cylinder E at a comparatively high rate of speed, I provide the rollers F, G, and H, engaging the peripheral surface of the said cylinder E at approximately equal distances apart, as is plainly indicated in Fig. 3. The rollers F, G, and H may be made of rubber or other suitable material, and are journaled in adjustable bearings arranged in the standards of the frame A, as plainly indicated in Fig. 2.

The three rollers F, G, and H are connected with each other by a belt I, so as to rotate the rollers simultaneously to impart the desired speed in a uniform manner to the cylinder E. On the shaft of the roller F are arranged the fast and loose pulleys J, connected by a belt K with other machinery to impart a rotary motion to the said roller F, which by the belt I imparts a rotary motion to the other two rollers G and H.

It will be seen that with a machine of the construction described no material whatever is wasted, and each piece or bar of lumber will be sawed into two molding-strips, one with a cove and the other quarter-round, as previously mentioned. Other forms may also be cut.

Having thus fully described my invention, I claim as new and desire to secure by Letters Patent—

A sawing machine, comprising a fixed spindle having a longitudinal recess for the passage of part of a piece of lumber, a cylinder mounted to turn on the said spindle, and formed at one end with saw teeth and abutting with its other end on a flange on the said spindle, and rollers in engagement with the peripheral surface of the said cylinder, a belt connecting the rollers, and means for operating one of the said rollers, substantially as shown and described.

WILLIAM V. LONG.

Witnesses:
W. H. ROBEY,
ANNA J. LONG.